(No Model.) 2 Sheets—Sheet 1.
P. KAUFMANN.
AUTOMATIC GRAIN MEASURE AND REGISTER.
No. 319,822. Patented June 9, 1885.
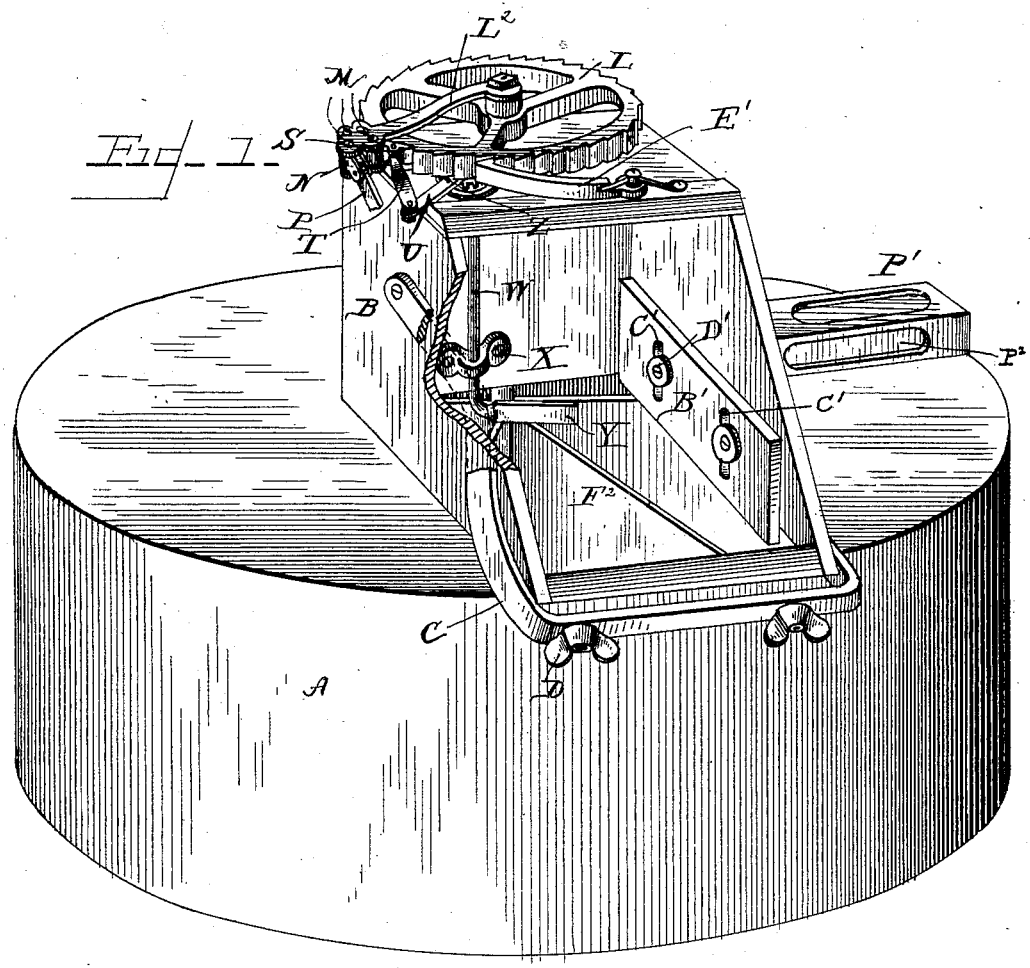
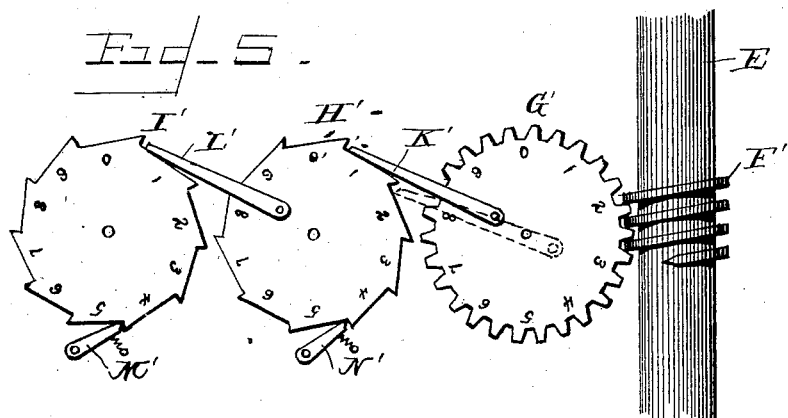
WITNESSES
F. L. Ourand
R. J. Cannell
INVENTOR
Peter Kaufmann
by Thos. Slade
Attorney (No Model.) 2 Sheets—Sheet 2.
P. KAUFMANN.
AUTOMATIC GRAIN MEASURE AND REGISTER.
No. 319,822. Patented June 9, 1885.
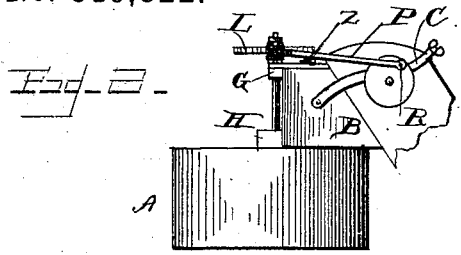
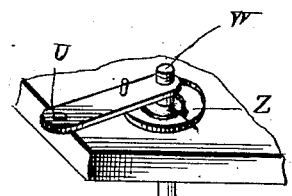
Fig. 7
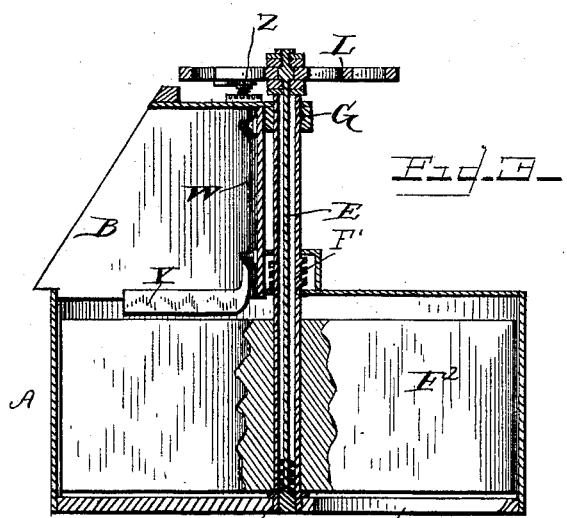
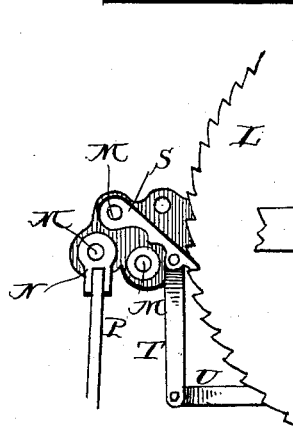
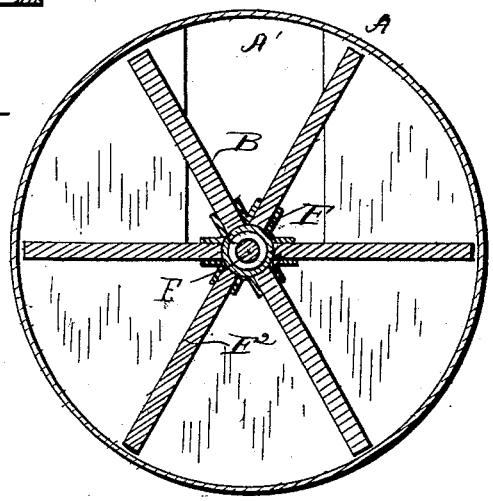
WITNESSES
F. L. Ourand
R. J. Gannell
INVENTOR
Peter Kaufmann
by Thos. Slade, his
Attorney

UNITED STATES PATENT OFFICE.

PETER KAUFMANN, OF HUDSON, ILLINOIS.

AUTOMATIC GRAIN MEASURE AND REGISTER.

SPECIFICATION forming part of Letters Patent No. 319,822, dated June 9, 1885.

Application filed December 17, 1884. (No model.)

*To all whom it may concern:*

Be it known that I, PETER KAUFMANN, of Hudson, (post-office address Bloomington,) in the county of McLean, and in the State of Illinois, have invented certain new and useful Improvements in Combination Grain Measure and Register and Elevator Attachments for the Same; and I do hereby declare that the following is a full, clear, and exact description thereof, reference being had to the accompanying drawings, and to the letters of reference marked thereon, making a part of this specification.

This invention relates to certain improvements in measuring devices for grain or seed elevators; and it has for its objects to provide for automatically measuring the grain or seed, registering the amount measured with mathematical accuracy, and finally discharging the grain or seed thus measured, as more fully hereinafter specified. These objects I attain by the means illustrated in the accompanying drawings, in which—

Figure 1 represents a perspective view of the measuring device detached from the elevator, with a portion broken away in order to show a portion of the internal mechanism. Fig. 2 represents a side elevation of the measuring device, showing the same attached to the top of the elevator. Fig. 3 represents a vertical sectional view of the measuring device; Fig. 4, a horizontal sectional view of the same; Fig. 5, a detached view showing the mechanism for registering the amount of grain measured in elevation; Fig. 6, a detached view showing a portion of the measuring mechanism in detail. Fig. 7 represents a detached perspective view showing the coiled spring attached to the shaft W.

The letter A indicates the measuring-chamber of the device, which consists of a cylindrical box of suitable determined capacity, which is provided with a shoe, B, at the top, having an inclined opening and adapted to be clamped to the upper end of the elevator-spout by means of a bail, C, having set or clamping screws D, as shown in Figs. 1 and 2 of the drawings.

Within the cylindrical box and concentric therewith is journaled a vertical shaft, E, having a hub, F, which is provided with a series of radial blades, $F^2$, which extend to the inner periphery of the box and are adapted to rotate therein. These blades may vary in number according to the capacity of the measuring device, the cubical area of the spaces between said blades being predetermined, so as to contain a given measure of grain or seed.

The central vertical shaft is constructed in two parts—an outer vertical tube and an inner solid rod, the tube being journaled in bearings G H, so as to rotate freely, and the inner rod being rigidly secured at its lower end to the lower inner end of the outer tube.

The said rod E is enlarged at its lower end, so as to fit snugly in the outer tube, the remaining portion being free, so as to twist and yield, after the manner of the ordinary rod door-spring, to prevent injury to the parts when the blades are obstructed at any portion of the intermittent motion of the measuring mechanism. The upper end of the vertical rod projects from the tubular portion of the shaft, and has keyed or otherwise securely fastened to it a ratchet-wheel, L, by which the said shaft is rotated at proper intervals, as more fully hereinafter specified.

Fulcrumed to the upper part of the tubular portion of the vertical shaft are two levers, which embrace the ratchet-wheel at each side and extend beyond the periphery of the said wheel, where they are securely connected by the bolts M, so that they may be oscillated together to move the ratchet-wheel by means of the mechanism to be presently set forth. To one of said bolts is pivoted a slotted head, N, which has pivoted in the slot at right angles to the bolt one end of a reciprocal rod, P, the other end of which is pivoted to a wrist-pin on a pulley, R, mounted on one end of the upper elevator-shaft. The slotted head and its pivotal connections form a universal joint, which permits the proper motion of the parts to rotate the ratchet-wheel at proper intervals.

S indicates a pawl pivoted to another of the before-mentioned connecting-bolts of the levers, as shown. Said pawl is slotted and pivoted to a link, T, which is in turn pivoted to the end of a lever, U, secured to the upper end of a vertical rod, W, which is journaled in suitable bearings, X, secured in the shoe of the measuring device, the lower end of said rod terminating just above the radial blades before mentioned, and being provided with a horizontal blade, Y, as shown in Fig. 1 of the drawings. Around the upper end of this rod is coiled a spring, Z, one end of which is secured to the top of the casing, and the other end of which is bent and bears against the lever U, so as to hold the pawl S normally away from the ratchet and permit the lever to be moved idly until the blade is obstructed with the inflowing grain, when the resistance thereto overcomes the tension of the spring, throwing the ratchet into engagement with the ratchet-wheel, so as to turn it step by step, carrying the blades forward, and advancing the spaces toward the outlet A' of the measuring-chamber.

The letter B' indicates a sweep provided with vertical slots C', and adjustably secured to one side of the hood by set-screws D', so that it may be adjusted with respect to the upper edges of the blades to regulate the quantity of grain carried to the outlet between them. The purpose in making the sweep adjustable is to provide for keeping its lower edge in close contact with the upper edges of the wings, as it may become worn, and thus secure mathematical accuracy in the measurement of the grain.

E' indicates a spring-pawl engaging with the ratchet-wheel to prevent the backward movements of the parts of the measuring device.

The outer tubular portion of the vertical shaft carrying the blades is provided with a worm, F', which intergears with the first of the series of registering-wheels G' H' I'. The said wheel is provided with a number of cogs, which may vary according to the capacity of the device, twenty-five of said cogs being represented in the present instance. The remaining two wheels are provided with ratchet-teeth, which are engaged by the advancing pawls K' L' and the retaining-pawls M' N', so as to register the quantity of grain passing through the device as the blades are rotated. The registering-wheels are suitably numbered, and are located in a box, P', having a glass face, P², through which the figures may be observed from time to time.

The operation of my invention will be readily understood in connection with the above description, and is as follows: The grain is carried up from the thrasher to the measuring-cylinder by the buckets operating in the elevator-tube and discharged into the said cylinder. Motion is imparted to the system of levers located at the upper part of the hood, which reciprocates the pawl idly as it is held by the tension of the spiral spring at the upper part of the oscillating bar out of engagement with the ratchet-wheel. When, however, the space directly below the hood between two of the radial blades is filled, and the blade on the lower end of the oscillating bar is obstructed, the pressure of the spiral spring is overcome, the pawl thrown into engagement with the ratchet-wheel, and the blades rotated so as to carry one of the previously-filled spaces to the discharge-opening. At the same time the registering mechanism is put in motion, so as to accurately record the amount of grain passing through the device.

Having thus described my invention, what I claim, and desire to secure by Letters Patent, is—

1. The combination, with the vertical shaft, its radial blades, and automatically-acting mechanism, of the adjustable sweep secured to the interior of the hood at one side, substantially as and for the purposes set forth.

2. The combination, with the shaft having radial blades adapted to rotate in the measuring-casing, of the intermittent actuating mechanism arranged to reciprocate idly by means of a tension-spring, and to rotate the shaft automatically by the obstruction of the grain, the sweep arranged above the blades, and the registering-wheels and mechanism for actuating the same, substantially as and for the purposes set forth.

3. The combination, with the vertical shaft E and its ratchet-wheel, of the actuating levers and pawl and the mechanism whereby said levers and pawl are operated to oscillate idly while the spaces between the radial blades are being charged with grain, and for throwing the said levers and pawl into engagement when the blades are to be advanced, and the spring-pawl E', substantially as described, and for the purposes set forth.

In testimony that I claim the foregoing I have hereunto set my hand this 17th day of November, 1884.

PETER KAUFMANN.

Witnesses:
  THOS. SLADE,
  R. J. CANNELL.